(12) United States Patent
Joo et al.

(10) Patent No.: US 8,068,310 B2
(45) Date of Patent: Nov. 29, 2011

(54) RIBBED BASE DECK TO ACCENTUATE PARTICLE FILTRATION

(75) Inventors: Goh Hong Joo, Singapore (SG); Gan Swee Chuan, Singapore (SG); Goh Jing Shi, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 320 days.

(21) Appl. No.: 12/503,392

(22) Filed: Jul. 15, 2009

(65) Prior Publication Data

US 2011/0013315 A1 Jan. 20, 2011

(51) Int. Cl.
*G11B 33/14* (2006.01)
(52) U.S. Cl. .................................... 360/97.02
(58) Field of Classification Search ........... 360/97.02, 360/97.01, 97.03, 97.04
See application file for complete search history.

(56) References Cited

U.S. PATENT DOCUMENTS

| | | | |
|---|---|---|---|
| 4,130,845 A | 12/1978 | Kulma | |
| 4,339,777 A | 7/1982 | Gruczelak | |
| 4,725,904 A | 2/1988 | Dalziel | |
| 5,453,890 A | 9/1995 | Takegami et al. | |
| 6,462,901 B1 | 10/2002 | Tadepalli | |
| 7,031,104 B1 | 4/2006 | Butt et al. | |
| 7,072,140 B2 | 7/2006 | Asano et al. | |
| 7,133,248 B2 | 11/2006 | Shin et al. | |
| 7,535,671 B2* | 5/2009 | Suzuki et al. | 360/97.02 |
| 7,733,602 B2* | 6/2010 | Gross et al. | 360/97.02 |
| 7,869,159 B2* | 1/2011 | Abe et al. | 360/97.02 |
| 2005/0185325 A1* | 8/2005 | Hur | 360/97.02 |
| 2009/0002879 A1* | 1/2009 | Abe et al. | 360/97.02 |

* cited by examiner

*Primary Examiner* — Allen Cao
(74) *Attorney, Agent, or Firm* — Braden Katterheinrich

(57) ABSTRACT

Base decks for data storage systems include a spindle motor region, a medium support region, an enclosure sidewall, and a recessed channel. The spindle motor region is configured to support a spindle motor assembly. The medium support region is beneath a storage medium when the storage medium is positioned within the base deck, and the enclosure sidewall surrounds an outer periphery of the storage medium when it is positioned within the base deck. The recessed channel is within the media support region and extends from the spindle motor region to the enclosure sidewall. The recessed channel illustratively has curved sidewalls that converge.

19 Claims, 8 Drawing Sheets

RIBBED BASE DECK TO ACCENTUATE PARTICLE FILTRATION

BACKGROUND

Hard disc drives commonly include a rigid housing that has a base deck and a top cover. The rigid housing encloses a variety of internal components. The components include a medium or media for storage of digital information that is mounted on a spindle motor assembly. The components also include an actuator assembly that is used to position one or more recording heads along the medium to read and/or write information to particular locations on the medium. The recording heads are mounted to a suspension of the actuator assembly. The suspension maintains the recording heads adjacent to or in contact with the surface of the medium. A voice coil motor is used to precisely position the actuator assembly.

Hard disc drives are sensitive to particulate contamination. Particles frequently enter hard disc drives during the manufacturing process or are generated by components within the disc drives. These particles can damage disc drive components and can negatively impact reliability. For example, particles in a disc drive may come into contact with the surface of the medium. This impact can cause physical damage to the surface resulting in the data stored in the impacted area being lost. Particles may also become lodge between a recording head and a recording medium. This can result in unstable recording head to recording medium spacing or a crash of the recording head into the recording medium.

SUMMARY

An aspect of the disclosure relates to ribbed base decks for data storage systems. In one embodiment, base decks include a spindle motor region, a medium support region, an enclosure sidewall, and a recessed channel. The spindle motor region is configured to support a spindle motor assembly. The medium support region is beneath a storage medium when the storage medium is positioned within the base deck, and the enclosure sidewall surrounds an outer periphery of the storage medium when it is positioned within the base deck. The recessed channel is within the media support region and extends from the spindle motor region to the enclosure sidewall. The recessed channel illustratively has curved sidewalls that converge.

These and various other features and advantages that characterize the claimed embodiments will become apparent upon reading the following detailed description and upon reviewing the associated drawings.

DETAILED DESCRIPTION

Embodiments of the present disclosure include ribbed base decks for data storage systems. Ribbed base decks illustratively include one or more recessed channels. Ribbed based decks may reduce the likelihood of a disc drive failure or disc drive damage caused by particulate contamination. For example, certain embodiments of recessed channels create expansion spaces beneath recording media. The expansions spaces draw air flows away from the recording media surfaces. This causes any particulate contamination that may be in the air flow to also be drawn away from the recording media surfaces. The increased distances between the particulate contamination and the recording media surfaces help to reduce the likelihood of a collision.

Ribbed base decks may also reduce the likelihood of collision between particulate contamination and a recording medium by increasing air flows from the inner radius of a recording medium to the outer radius of the recording medium (i.e. by increasing a radial air flow). For example, particulate contamination may be in an area beneath a recording medium. The increased air flows may help to move the particulate contamination from under the recording medium to an area away from the recording medium where the likelihood of a collision is reduced. The increased radial air flows may also reduce the likelihood of a collision by preventing particulate contamination from entering the area surrounding a recording medium in the first place. For instance, particulate contamination may be outside the recording medium region (e.g. it may be in the actuator region) and may be on a course or path to enter the recording medium region. The increased radial air flows may redirect or divert the contamination away from the recording medium region to a region where the contamination is less likely to collide with the recording medium (e.g. the contamination may be redirected to a recirculation filter).

Figure 1:
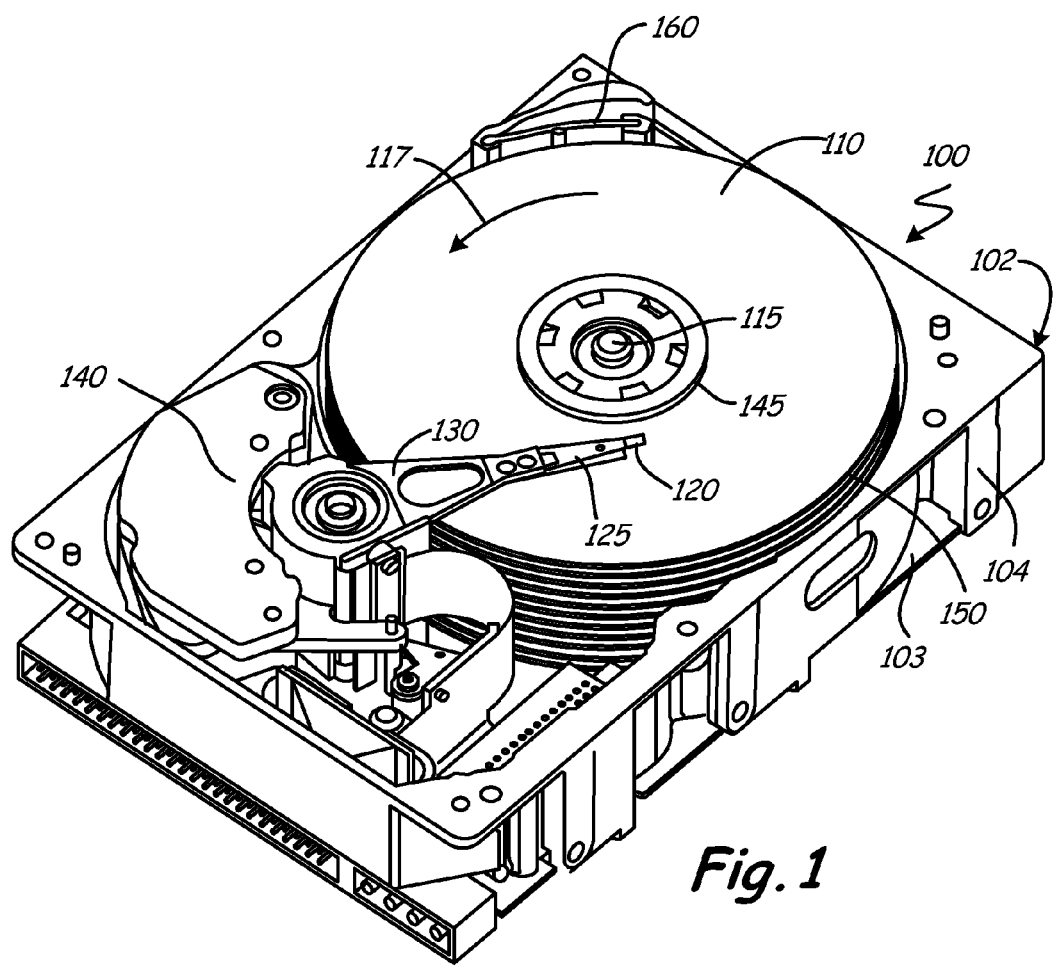
FIG. 1 is a perspective view of a hard disc drive.
Figure 2:
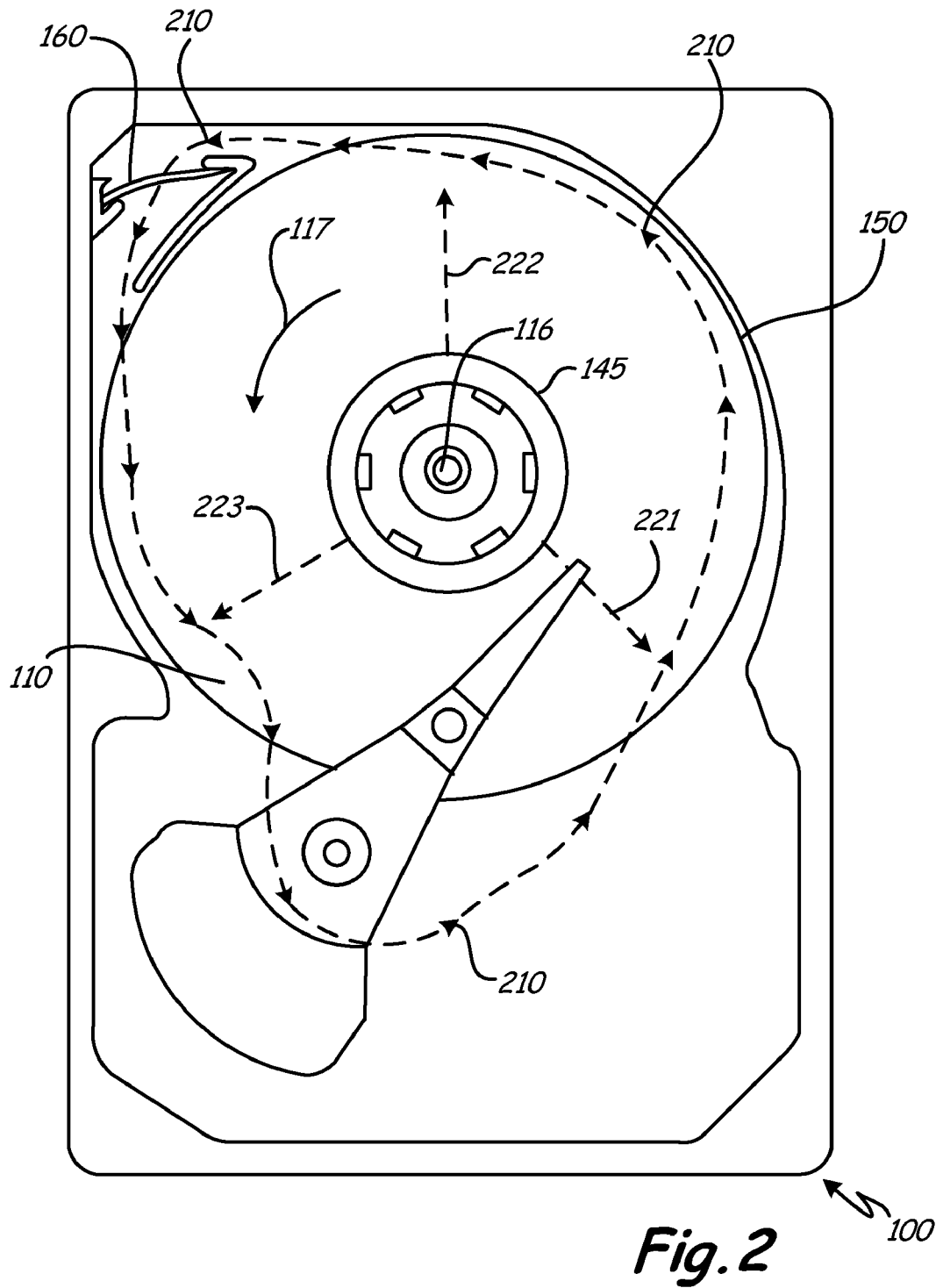
FIG. 2 is a top down schematic diagram of air flows in a hard disc drive.

Before further describing embodiments of ribbed base decks, it is worthwhile to first describe illustrative operating environments in which some embodiments may be incorporated. The operating environments shown in FIGS. 1 and 2 are for illustration purposes only. Embodiments of the present disclosure are not limited to any particular environment and are optionally practiced within any number of different types of operating environments.

FIG. 1 is a perspective view of a hard disc drive 100. Hard disc drives are a common type of data storage system. While embodiments of this disclosure are described in terms of disc drives, other types of data storage systems should be considered within the scope of the present disclosure.

Disc drive 100 includes an enclosure 102 that houses the disc drive internal components. Enclosure 102 includes a base deck 103, a top cover (not shown), and sidewalls 104 that connect the base deck to the top cover. Disc drive 100 also includes a magnetic disc or recording medium 110. Those skilled in the art will recognize that disc drive 100 can contain a single disc or multiple discs. Medium 110 is rotatably mounted to base deck 103 by a spindle motor assembly 115. Spindle motor assembly 115 facilitates rotation of medium 110 about a central axis. An illustrative direction of rotation is shown by arrow 117. Each disc surface has an associated recording head 120 that carries a read/write component or components for communication with the surface of the disc. Each head 120 is supported by a head gimbal assembly 125, which is in turn attached to an actuator arm 130. Each actuator arm 130 is rotated about a shaft by a voice coil motor assembly 140. As voice coil motor assembly 140 rotates actuator arm 130, head 120 moves in an arcuate path between a disc inner radius 145 and a disc outer radius 150. Disc drive 100 further includes a recirculation filter 160. The operation of filter 160 is discussed below in the description of FIG. 2.

FIG. 2 is a top down schematic diagram of air flows in hard disc drive 100. Air flows are induced within drive 100 by rotation 117 of one or more discs 110 about an axis of rotation 116. The air flows shown in FIG. 2 are simplified to show overall air flow patterns. Specific air flows at any particular point within a disc drive may vary from those shown in FIG. 2. Also, the air flows in FIG. 2 are for illustration purposes only. Embodiments of the present disclosure are not limited to data storage systems having the air flows shown in FIG. 2 or to data storage systems having any specific air flow patterns.

FIG. 2 shows two types of air flows. It shows circumferential air flow 210 and radial air flows 221, 222, and 223. Circumferential air flow 210 circles around recording medium axis of rotation 116. The specific circumferential air flow pattern shown in FIG. 2 is just one example of a circumferential air flow. Circumferential air flows are not limited to any particular path or route around axis of rotation 116.

Radial air flows 221, 222, and 223 travel or flow from recording medium inner radius 145 to recording medium outer radius 150. Rotation 117 of discs 110 commonly generates centripetal forces that induce radial air flows such as air flows 221, 222, and 223. However, it is worth noting that in some embodiments that the actual air flow in any one or more particular regions may actually flow in the opposite direction (i.e. from recording medium outer radius 150 towards recording medium inner radius 145). In such a case, the radial air flow can be viewed or characterized as being negative. For example, circumferential air flow 210 may have an air flow vector going from outer radius 150 to inner radius 145 that is larger than the outward air flow caused by radial air flow 221. This may cause air to flow towards the recording medium inner radius 145 along the region represented by radial air flow 221.

FIG. 2 also shows that drive 100 optionally includes recirculation filter 160. Filter 160 is illustratively positioned within drive 100 such that air flows across or through the filter. Filter 160 removes contamination within the passing air and recirculates the air back to the recording medium region (i.e. the location of the recording medium and the space vertically above and below the recording medium).

Figure 3:
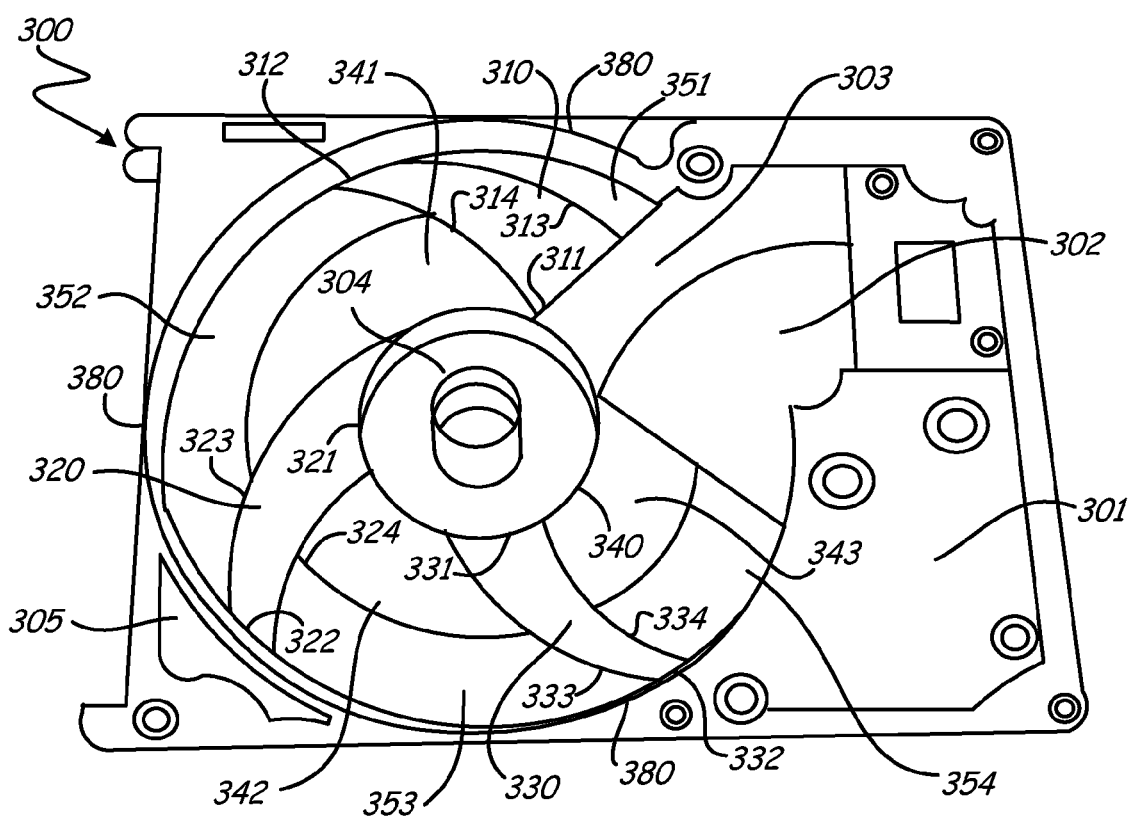
FIG. 3 is a top down view of a ribbed base deck.

FIG. 3 is a top down view of a ribbed base deck 300 in accordance with one embodiment of the present disclosure. Base deck 300 is illustratively included within a data storage system enclosure such as enclosure 102 in FIG. 1 and is configured to support other hard disc drive components. For instance, deck 300 optionally includes a voice coil motor assembly region 301 configured to support a voice coil motor assembly such as assembly 140 in FIG. 1, an actuator region 302 configured to support an actuator such as actuator 130 in FIG. 1, and a head gimabal assembly region 303 configured to support a head gimbal assembly such as assembly 125 in FIG. 1. Deck 300 also optionally includes a spindle motor region 304 configured to support a spindle motor assembly such as assembly 115 in FIG. 1 and a recirculation filter region 305 configured to support a filter such as filter 160 in FIGS. 1 and 2.

Ribbed base decks illustratively include one or more recessed channels. Ribbed base deck 300 in FIG. 3 is shown to have three recessed channels, channels 310, 320, and 330. Embodiments however include any number of recessed channels (e.g. 1, 2, 3, 4, 5, 6, etc.). Base deck 300 further includes inner media support regions 341, 342, and 343 and outer media support regions 351, 352, 353, and 354. The areas included within channels 310, 320, 330, inner media regions 341, 342, 343, and outer media regions 351, 352, 353, 354, illustratively lie beneath or partially beneath a recording medium when a recording medium is positioned within the base deck.

Figure 4:
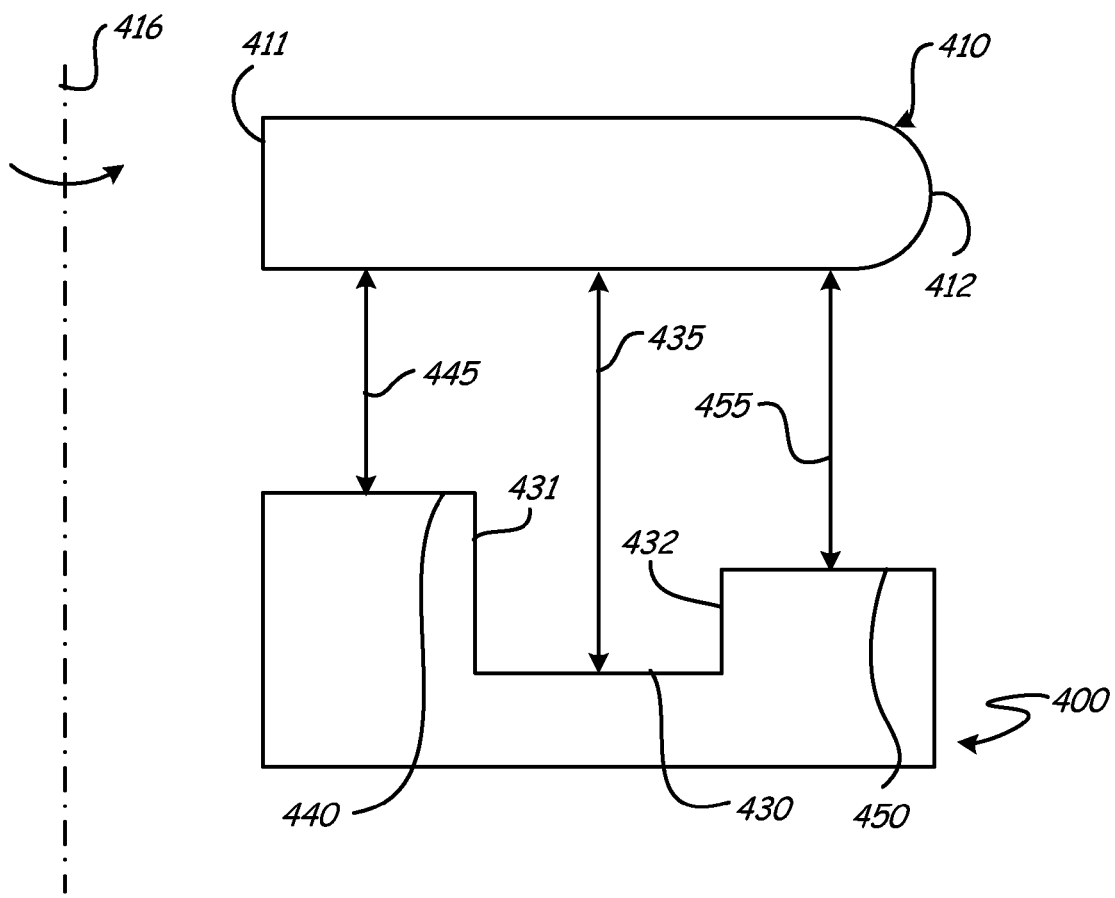
FIG. 4 is a schematic cross-sectional view of a ribbed base deck and a recording medium.

FIG. 4 is a schematic cross-sectional view of a ribbed base deck 400 and a recording medium 410. FIG. 4 shows the relative heights or depths of the ribbed base deck areas. Recording medium 410 has an inner radius 411 that is proximate a spindle motor assembly axis of rotation 416, and an outer radius 412. Distance 445 represents the distance between an inner media region surface 440 and the bottom surface of recording medium 410. Distance 435 represents the distance between a channel bottom surface 430 and the bottom surface of recording medium 410, and distance 455 represents the distance between an outer media region surface 450 and the bottom surface of recording medium 410.

In an embodiment, such as that shown in FIG. 4, the channel bottom surfaces 430 are deeper or further recessed into base decks than either inner media regions 440 or outer media regions 450, and outer media regions 450 are further recessed than inner media regions 440. In one specific embodiment, distance 445 is 0.381 millimeters, distance 435 is 0.881 millimeters (i.e. the channels are recessed 0.5 millimeters from the inner media region), and distance 455 is 0.4572 millimeters. Embodiments are not however limited to any specific absolute dimensions or even to any specific relative dimensions. For instance, in an embodiment, inner media region 440 is more recessed than outer media region 450. In another embodiment, such as that shown in FIG. 6 which will be described in further detail below, there is only one media region instead of two, and the channels are recessed from the one media region. In yet another embodiment, a base deck includes any number of media regions each having different heights or depths. Different media regions may illustratively be useful to provide additional physical support for recording media. In multi-media region embodiments, channels are illustratively recessed from one or more of the media regions, including being recessed from all of the media regions.

Each channel illustratively has two sidewalls such as channel sidewalls 431 and 432 in FIG. 4. Sidewalls 431 and 432 are shown in FIG. 4 as being perpendicular (i.e. at a ninety degree angle) relative to channel bottom surface 430. In other embodiments, channel sidewalls and bottom surfaces are at any angle relative to each other (e.g. an acute or an obtuse angle). Additionally channel sidewalls need not be straight. Embodiments of sidewalls include curved or smoothed sidewalls.

As can be seen in FIGS. 3 and 4, channels 310, 320, and 330 create expansion areas (i.e. regions with increased volumes) beneath recording media. As air within a disk drive passes over the channels (e.g. radial air flows 221, 222, and 223 in FIG. 2), the air expands into the channels resulting in an area or region of reduced pressure. This reduced pressure draws air, as well as any particulate contamination being carried along with the air, to be drawn away from the surface of a recording medium and down towards a channel. This increases the distance between a recording medium and particulate contamination, and reduces the likelihood of the particulate contamination colliding with the recording medium.

Returning to FIG. 3, FIG. 3 shows that first channel 310 includes an inner side 311 and an outer side 312. Inner side 311 and outer side 312 are connected by a first sidewall 313 and a second sidewall 314. Sidewalls 313 and 314 are illustratively curved. In one embodiment, such as that shown in FIG. 3, sidewalls 313 and 314 are curved in the direction of an air flow to prevent turbulence. For example, air flow in base deck 300 illustratively flows in the direction shown by arrow 210 in FIG. 2 (i.e. counterclockwise from a top down view).

In such a case, the sidewalls are also curved in a counterclockwise fashion. Reduced turbulence is illustratively beneficial for proper function of hard drive components (e.g. in controlling "fly height") and for smoothly moving particles from a recording media inner radius to a recording media outer radius.

In an embodiment, again such as that shown in FIG. 3, sidewalls 313 and 314 converge (i.e. the spacing or distance between the sidewalls is decreased) going from inner side 311 to outer side 312. This reduces the amount of volume or space in a channel going from the recording media inner radius to the recording media outer radius. Accordingly, when air flows radially outward as is shown by radial air flows 221, 222, and 223 in FIG. 2, the air in the channel travels faster as it goes outward to get the same amount of air through a smaller space or volume. This effect may reduce the likelihood of a collision between a recording medium and a particle by reducing the amount of time the particle is beneath the recording medium (e.g. a particle is moved more quickly from being under the recording medium to an area away from the recording medium).

Like first channel 310, second channel 320 illustratively has an inner side 321, an outer side 322, a first sidewall 323, and a second sidewall 324. Third channel 330 also illustratively has an inner side 331, an outer side 332, a first sidewall 333, and a second sidewall 334. Outer sides 312, 322, and 332 are illustratively either approximately parallel or approximately tangential to an outer circumference 340 of spindle motor region 304. Inner sides 311, 321, and 331 are also illustratively either approximately parallel or approximately tangential to outer circumference 340 of spindle motor region 304. For instance, in FIG. 3, inner sides 321 and 331 are approximately parallel to the outer circumference of spindle motor region 304. In another embodiment, one or more of inner sides 311, 321, and 331 extend from spindle motor region 304 to an enclosure sidewall 380. Enclosure sidewall 380 illustratively surrounds or partially surrounds the circumference of a recording medium when the recording medium is positioned within a base deck. In FIG. 3, inner side 311 illustratively extends from spindle motor region 304 to enclosure sidewall 380. Embodiments of inner sides 311, 321, 331 and outer sides 312, 322, 332 are not however limited to any particular orientations or combinations of orientations, and include all orientations and combinations of orientations.

Orientations of inner sides 311, 321, and 331 are optionally selected or chosen based upon air flow patterns within a disc drive. In one embodiment, channels having an inner side that extends between a spindle motor region and an enclosure sidewall (e.g. side 311 in FIG. 3) are used in areas having an overall inward radial air flow. In this situation, the inward air flow is reduced by redirecting, diverting, or diffusing the flow towards a recording medium outer radius. In another embodiment, channels having an inner side approximately parallel or approximately tangential to an outer circumference of a spindle motor region (e.g. sides 321 and 331 in FIG. 3) are used in areas having an overall outward radial air flow. In this situation, the outward radial air flow is increased or accentuated. In one embodiment, air flows are redirected towards a recirculation filter such that any particulate contamination in the air flows is removed. An example of such an embodiment includes positioning the outer side of a channel adjacent to a recirculation filter (e.g. outer side 322 in FIG. 3 is adjacent to recirculation filter region 305).

Figure 5:
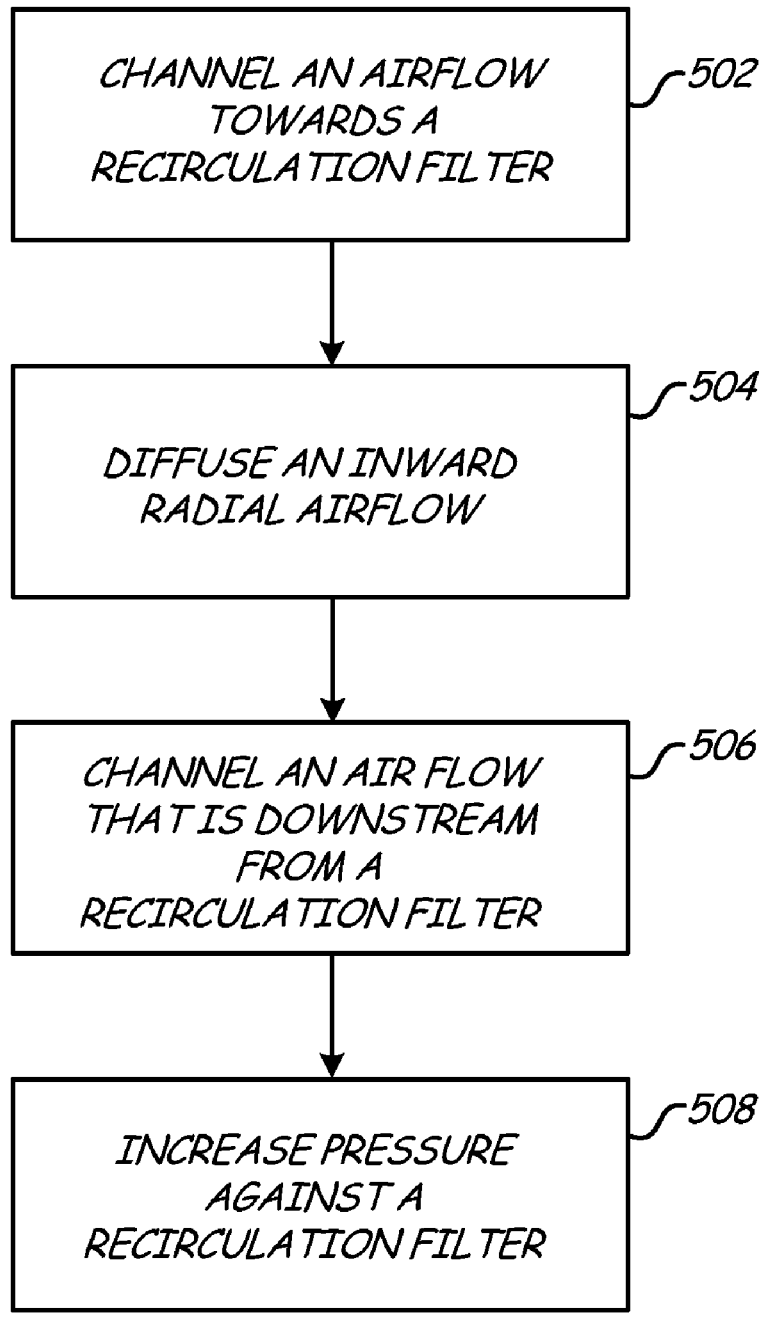
FIG. 5 is a flow diagram of a method of redirecting air flows within a data storage system.

FIG. 5 is a flow diagram of one illustrative method of redirecting air flows within a data storage system. At step 502, an air flow is channeled towards a recirculation filter. For instance, in one embodiment, creating channel 320 in FIG. 3 channels an air flow from the inner radius of a recording medium to the outer radius of the recording medium. Outer side 322 of channel 320 is optionally positioned adjacent to recirculation filter region 305. This directs the air flow towards a recirculation filter that may be included within region 305, and the recirculation filter illustratively removes the particle.

At step 504, a radially inward air flow is diffused. For instance, in an embodiment, an air flow travels from head gimbal assembly region 303 in FIG. 3 towards spindle motor assembly region 304. A second channel 310 is created that has its inner side or opening side 311 adjacent to head gimbal assembly region 303. The air flow that previously traveled radially inward, now follows the path of channel 310. This illustratively redirects or diffuses the air flow (i.e. the inward radial air flow is decreased or is redirected to another direction such as radially outward).

At step 506, an air flow that is downstream from a recirculation filter is redirected or channeled from flowing or traveling radially inward to traveling radially outward. For instance, in an embodiment, a recirculation filter is positioned within recirculation filter 305 in FIG. 3, and the circumferential air flow travels counterclockwise as is shown by air flow 210 in FIG. 2. Air downstream from the recirculation filter illustratively flows at least partially radially inward. As can be seen in the embodiment shown in FIG. 3, channel 330 is illustratively downstream from a recirculation filter in region 305 (given the counterclockwise circumferential air flow). Channel 330 channels, redirects, or diffuses the radially inward air flow such that the radially inward air flow is decreased or such that the air flow is redirected to flowing radially outward.

At step 508, the pressure against a recirculation filter is increased. An increase in pressure at the recirculation filter illustratively corresponds to an increased amount of air flow through the recirculation filter. In an embodiment, the amount of air flow and the pressure are increased by increasing a circumferential air flow (e.g. air flow 210 in FIG. 2) that passes though a recirculation filter. For example, channels 310, 320, and 330 in FIG. 3 illustratively direct or channel air flow from within a recording medium region outward towards a circumferential air flow that passes through a recirculation filter. This increases the amount of circumferential air flow and correspondingly increases the pressure against the filter. The increased pressure is an indication that the air within a disc drive is being better filtered (i.e. the volume of air in the disc drive passes through the filter at a higher rate). Accordingly, the air in such a disc drive may carry a reduced amount of particulate contamination.

Figure 6:
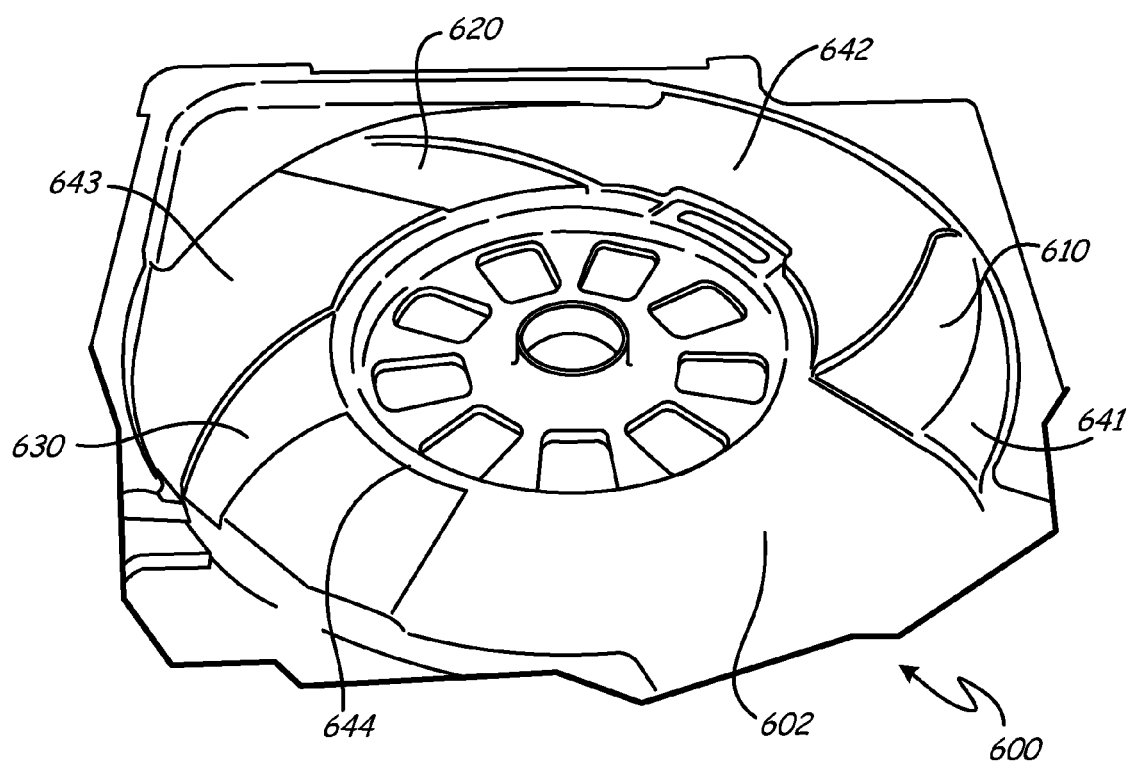
FIG. 6 is a partial perspective view of a ribbed base deck.

FIG. 6 is a partial perspective view of another embodiment of a ribbed base deck 600. Base deck 600 includes a first channel 610, a second channel 620, and a third channel 630. As was previously mentioned, unlike deck 300 in FIG. 3, deck 600 does not have two different types of media regions (e.g. regions 341 and 351 in FIG. 3). Instead, all of the media regions in deck 600, regions 641, 642, 643, and 644, are the same or approximately the same (i.e. they have the same or approximately the same relative heights or depths). Also as can be seen in FIG. 6, deck 600 does not have separate regions for an actuator and a head gimbal assembly such as regions 302 and 303 in FIG. 3. Instead, deck 600 has a combined actuator/head gimbal assembly region 602 that is configured to support both an actuator and a head gimbal assembly.

Figure 7:
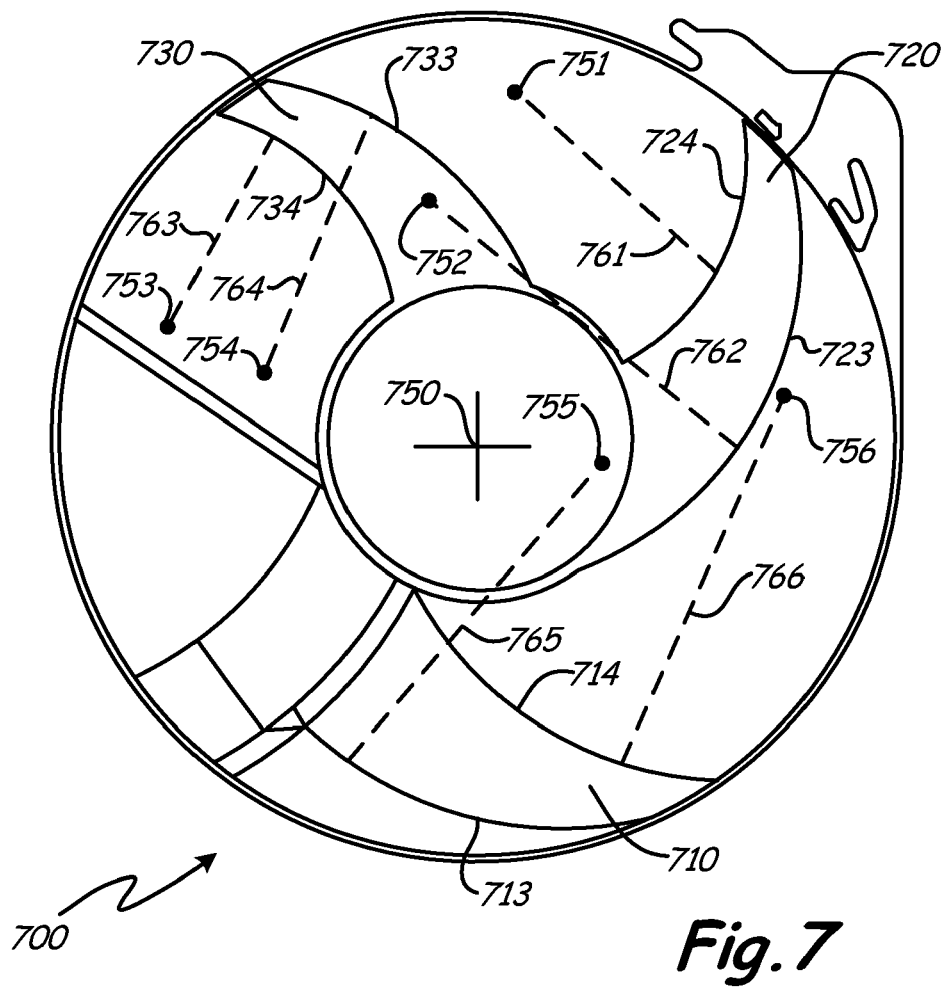
FIG. 7 is a partial top down view of a ribbed based deck.

FIG. 7 is a partial top down view of another embodiment of a ribbed based deck 700. Base deck 700 includes a first channel 710 having a first sidewall 713 and a second sidewall 714, a second channel 720 having a first sidewall 723 and a second sidewall 724, and a third channel 730 having a first sidewall 733 and a second sidewall 734.

The sidewalls in base deck 700, as well as sidewalls in other ribbed base decks, are optionally partial segments of circumferences of circles. Point 750 is illustratively the origin (0,0) of a Cartesian coordinate system where each point in the base deck can be represented by an X value and a Y value relative to the origin (i.e. (x, y)). In one embodiment, sidewall 713 is made by rotating a radius 765 having a length of 30 millimeters (mm) from point 755 that has the coordinates (6.58 mm, −0.3 mm). Sidewall 714 is made by rotating a radius 766 having a length of 28.14 mm from point 756 that has the coordinates (19.6 mm, 1.0 mm). Sidewall 723 is made by rotating a radius 762 having a length of 27 mm from point 752 that has the coordinates (−1.62 mm, 15.1 mm). Sidewall 724 is made by rotating a radius 761 having a length of 18 mm from point 751 that has the coordinates (3.51 mm, 21.84 mm). Sidewall 733 is made by rotating a radius 764 having a length of 27 mm from point 754 that has the coordinates (−20.7, 1.41), and sidewall 734 is made by rotating a radius 763 having a length of 18 mm from point 753 that has the coordinates (−24.51, 7.94).

Figure 8:
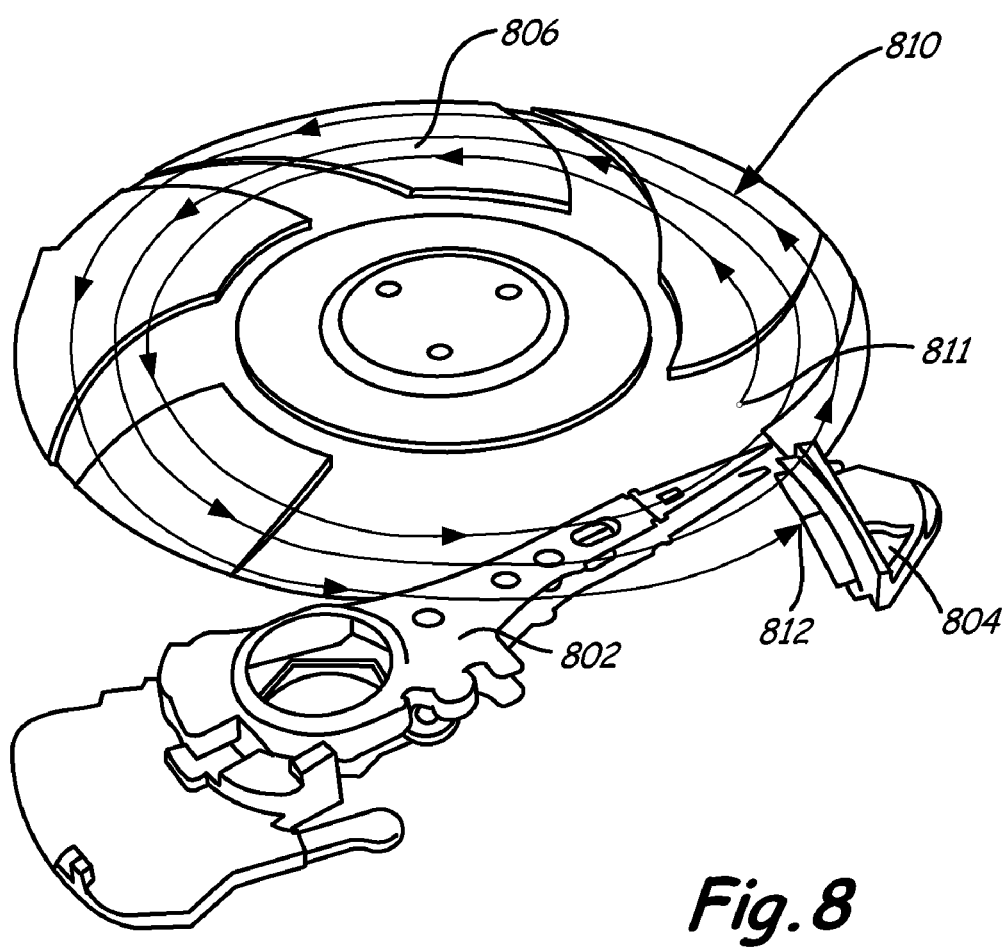
FIG. 8 is a schematic diagram of an exemplary particle path in a disc drive having a ribbed base deck.

FIG. 8 is a schematic diagram of an exemplary particle path in a disc drive having a ribbed base deck. FIG. 8 shows an actuator arm 802, a recirculation filter 804, a ribbed base deck 806, and a particle path 810. In FIG. 8, particle path 810 illustratively occurs at least partially beneath a recording medium, but the recording medium has been removed from the view shown in FIG. 8 to better show details of the particle path. It should be noted that path 810 is for illustration purposes only. Embodiments of the present disclosure are not limited to any particular particle paths and include any particle path.

Particle path 810 has a beginning point 811 and an ending point 812. As radial and circumferential air flows are induced by a rotating recording medium or media, the particle begins to move radially outward (due to the radial air flows) and along a circumferential path (due to the circumferential air flow). Particle path 810 completes two full three-hundred and sixty degree revolutions around base deck 806. Particle path ending point 812 occurs at recirculation filter 804 where the particle is removed from the air within the hard drive by the recirculation filter.

The time needed to move a particle from an area within a hard drive where it may collide with a recording medium to a recirculation filter is sometimes referred to as the "clean-up time." In certain embodiments, clean-up times are reduced (i.e. shorter time durations) in data storage systems that utilize ribbed base decks as compared to data storage systems that do not utilize ribbed base decks. For instance, in a data storage system having a ribbed base deck, the channel or channels may increase radial air flows outward which decreases the amount of time needed to move a particle away from the recording medium and toward a recirculation filter. In a data storage system without a ribbed base deck, a particle may complete more revolutions around the base deck before being removed by a recirculation filter (i.e. as compared to the two revolutions shown in FIG. 8).

During a data storage "clean up," particles illustratively travel between a base deck and the bottom surface of a recording medium. As has been previously, in certain embodiments, channels create expansion spaces that draw air flows downward and away from the bottom surface of a recording medium. In such a case, particle paths such as particle path 810 occur at a distance from the recording medium bottom surface that is greater than the distance of such a particle path in a data storage system without a ribbed base deck (i.e. a particle in a non-ribbed base deck follows a path that is closer to the bottom surface of a recording medium).

The reduced clean up times and distances between particles and recording media discussed above each illustratively reduces the likelihood of a collision between a particle and a recording medium. Additionally, at least in certain embodiments, the two effects work together such that particles are removed more quickly and they follow a path that is at an increased distance from the recording medium. In such embodiments, the likelihood of a collision is even further reduce.

Thus far, embodiments of the present disclosure have only been discussed in the context of a base deck for a data storage system enclosure. Embodiments are not however so limited. For instance, features of ribbed base decks may be included within other components such as, but not limited to, a top cover of a data storage system enclosure. For example, a top cover illustratively has recessed channels (i.e. channels extending away from the top recording medium). Embodiments of top covers with recessed channels create expansion areas that draw particles away from the top surface of the top recording medium and that increase radial air flow outward away from the recording medium. These effects similarly reduce the likelihood of a collision between a particle and a recording medium, as has been discussed in regards to the base deck embodiments.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although the embodiments described herein are directed to hard disc drives, it will be appreciated by those skilled in the art that the teachings of the disclosure can be applied to other types of data storage systems, without departing from the scope and spirit of the disclosure.

What is claimed is:
1. A base deck for a data storage system comprising:
  a spindle motor region configured to support a spindle motor assembly;
  a medium support region that is beneath a recording medium when the recording medium is positioned within the base deck; and
  a recessed channel within the media support region, the recessed channel having first and second sidewalls that converge toward each other as the recessed channel extends radially outward from the spindle motor region.
2. The base deck of claim 1, wherein the first and the second sidewalls are curved.
3. The base deck of claim 2, wherein the first sidewall is a partial segment of a circumference of a circle.
4. The base deck of claim 2, wherein the recessed channel includes an inner side and an outer side, the first and second sidewalls extending between the inner side and the outer side, and wherein the inner side is approximately parallel to an outer circumference of the spindle motor region.
5. The base deck of claim 4, wherein the recessed channel outer side is adjacent to a recirculation filter area.
6. The base deck of claim 2, wherein the recessed channel includes an inner side and an outer side, the first and second sidewalls extending between the inner side and the outer side, and wherein the inner side extends along a distance between the spindle motor region and the enclosure sidewall.

7. The base deck of claim 1, wherein the medium support region comprises an inner medium support region and an outer medium support region, and wherein the outer medium support region is recessed from the inner medium support region.

8. The base deck of claim 1, further comprising a second recessed channel and a third recessed channel, the second and the third recessed channels within the medium support region and extending from the spindle motor region to the enclosure sidewall.

9. A method comprising:
channeling an air flow in a direction from an inner radius of a recording medium to an outer radius of the recording medium by creating a first channel in a base deck; and
reducing a volume of the first channel as the channel extends from the inner radius to the outer radius of the recording medium.

10. The method of claim 9 further comprising:
directing the air flow towards a recirculation filter.

11. The method of claim 10 further comprising:
removing a particle utilizing the recirculation filter.

12. The method of claim 11 further comprising:
diffusing a second air flow that goes from a head gimbal assembly actuator region to the inner radius of the recording medium by creating a second channel in the base deck, the second channel having an opening adjacent to the head gimbal assembly actuator region.

13. The method of claim 12 further comprising:
channeling a third air flow that is downstream from the recirculation filter in a direction from the inner radius of the recording medium to the outer radius of the recording medium utilizing a third channel in the base deck.

14. The method of claim 9, wherein the reducing step causes an increase in velocity of the airflow in the first channel as the first channel reduces in volume.

15. A base deck comprising:
a first recessed channel that extends radially outward from a spindle motor region, wherein a volume of the first recessed channel decreases as the channel extends outward.

16. The base deck of claim 15, wherein the first recessed channel has a first sidewall and a second sidewall, the first and the second sidewalls configured to channel air flow from an inner radius of a recording medium to an outer radius of the recording medium.

17. The base deck of claim 16, wherein the first and second sidewalls direct air flow to a recirculation filter.

18. The base deck of claim 15, and further comprising a top cover, the top cover having a second recessed channel creating an expansion space above the recording medium.

19. The base deck of claim 15, further comprising a second recessed channel within the base deck.

* * * * *